United States Patent

[11] 3,581,426

| [72] | Inventor | Earl E. Miller |
| | | Dowagiac, Mich. |
| [21] | Appl. No. | 799,601 |
| [22] | Filed | Feb. 17, 1969 |
| [45] | Patented | June 1, 1971 |
| [73] | Assignee | Victor Comptometer Corporation |
| | | Chicago, Ill. |

[54] FISHING REEL SECURING DEVICE
14 Claims, 6 Drawing Figs.

[52] U.S. Cl. .................................................. 43/22,
285/343
[51] Int. Cl. .......................................... A01k 87/06
[50] Field of Search .......................................... 43/22;
285/89, 343, 81

[56] References Cited
UNITED STATES PATENTS
2,166,407   7/1939   Howarth..................... 43/22
2,450,581   10/1948  Couty........................ 285/343X
2,758,852   8/1956   Newell....................... 285/343

Primary Examiner—Aldrich F. Medbery
Assistant Examiner—Daniel J. Leach
Attorney—Harness, Dickey & Pierce ABSTRACT: In combination with a fishing rod comprising a handle section adapted to operatively support the mounting section of an associated fishing reel, ferrule means adjustably movable longitudinally of the fishing rod and engageable with the mounting section of the fishing reel for securing the reel on the rod, collar means rotatably mounted on the handle section for limiting longitudinal movement of the ferrule means relative to the reel mounting section, and means including an annular resilient deformable locking ring interposed between the ferrule means and the collar means for resisting rotation of the collar means so as to prevent longitudinal displacement of the collar means relative to the ferrule means and thereby maintain the ferrule means positively engaged with the mounting section of the fishing reel.

PATENTED JUN 1 1971  3,581,426
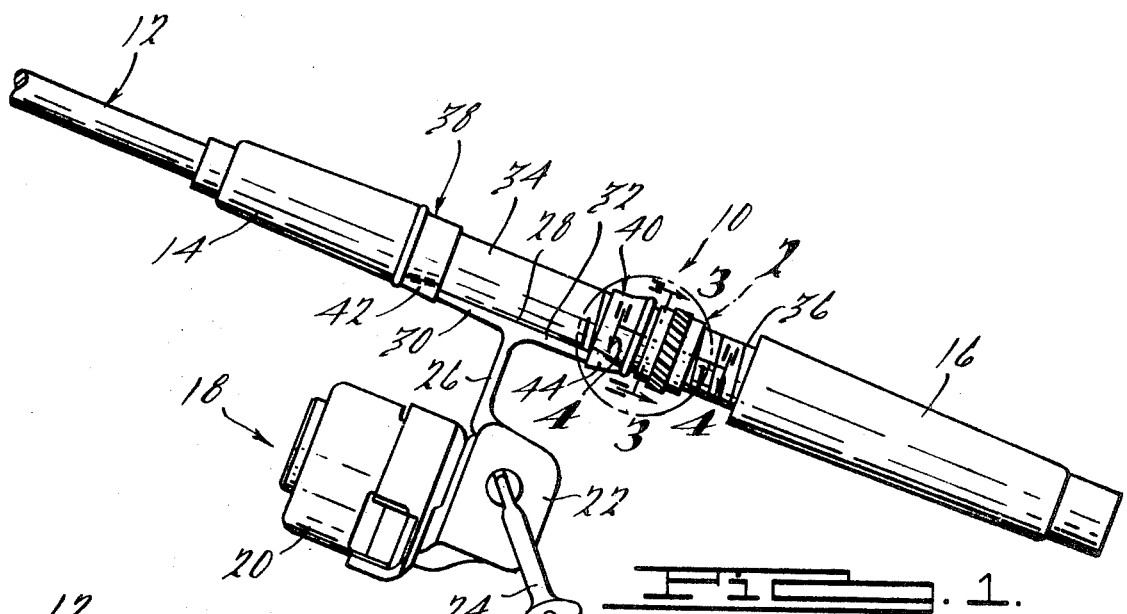
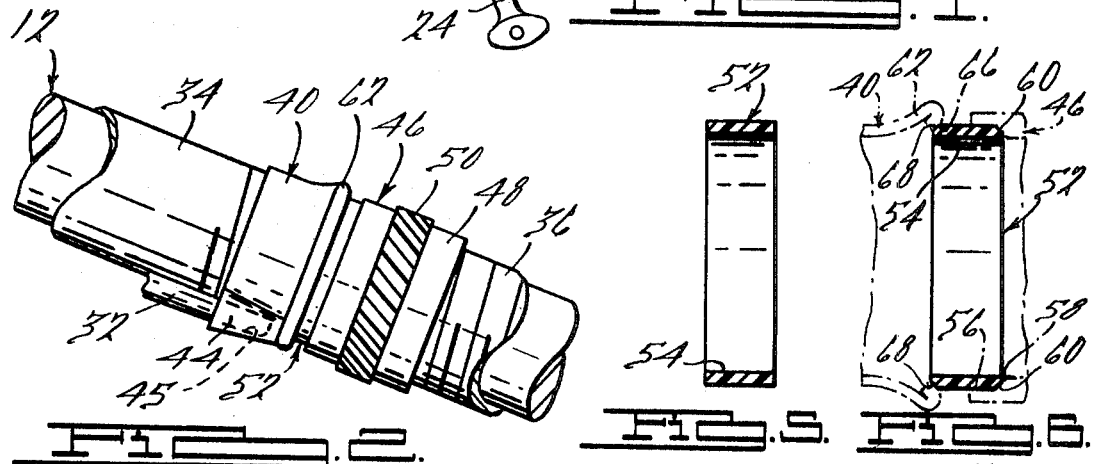
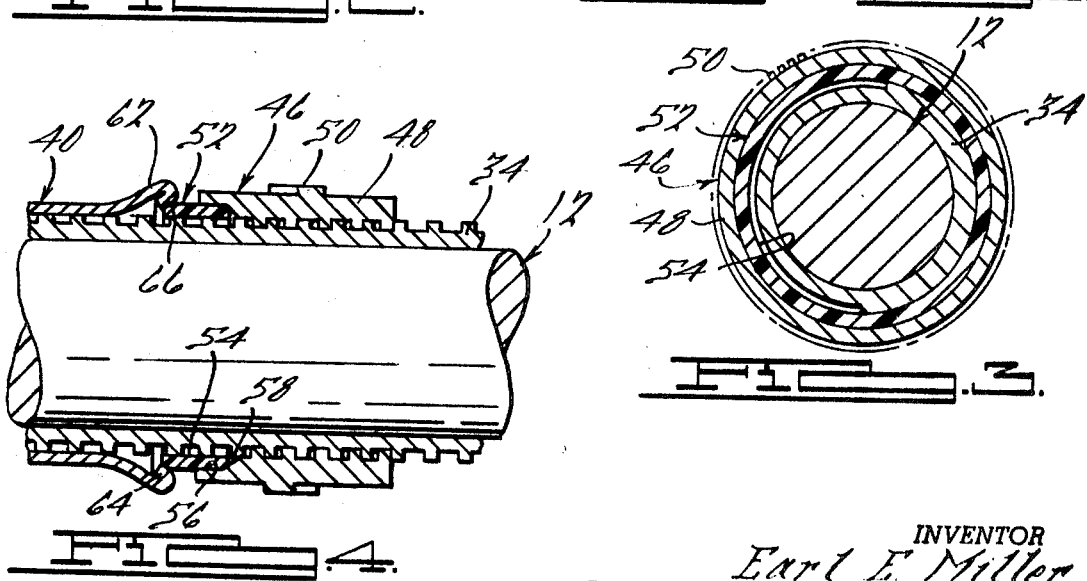
INVENTOR
Earl E. Miller
BY Harness, Dickey & Pierce
ATTORNEY

FISHING REEL SECURING DEVICE

BACKGROUND OF THE INVENTION

It is heretofore been the practice in mounting fishing reels of the spin, fly, or casting type on associated fishing rods to compressingly engage a longitudinally extending mounting tang section on the reel between a pair of mounting ferrule members on the fishing rod, with one of the ferrule members usually being fixedly attached to the rod and the other thereof being longitudinally movable thereof. Conventionally, a rotatable collar member is provided on the rod handle adjacent the movable ferrule member, and this member is adapted to be threadably advanced toward the movable ferrule member to exert an axial or longitudinal force thereagainst to assure positive retention of the reel-mounting tang section between the two ferrule members. One particular disadvantage of the above fishing reel mounting arrangement has arisen from the fact that the fishing reels may become inadvertently disengaged or dismounted from their associated rods in the event the ferrule members are longitudinally displaced away from one another, as would occur in the event the collar member is inadvertently rotated along its associated threaded portion of the rod handle. Such rotational displacement of the collar and hence displacement of the mounting ferrule members has been found to frequently occur during periods of extremely active fishing, and in some cases, such displacement will occur over a long period of time by merely packing, unpacking, carrying or other normal handling of the rod and reel assembly.

The present invention is directed toward a new and improved construction which is designed to obviate the possibility of inadvertent disassembly of a fishing reel from its associated fishing rod. More particularly, the present invention is directed toward a device for preventing inadvertent longitudinal displacement of the reel-securing ferrule and collar members normally provided on fishing rods. This is achieved through the provision of a novel locking ring and cooperable ferrule and collar members adapted to compressingly engage the ring in the manner such that the same is maintained under a state of compression. The locking ring is preferably fabricated of a relative resilient and deformable polymeric material, such as nylon, Delrin or the like and is adapted to cooperate with generally radially and longitudinally inclined tapered face portions on the adjacent ends of the associated collar and ferrule members to achieve positive securing or mounting of an associated fishing reel, and it is accordingly a general object of the present invention to provide a new and improved device to accomplish this end.

It is another object of the present invention to provide a new and improved fishing reel securing device which is of an extremely simple design, which is economical to manufacture and easy to assemble.

It is a further object of the present invention to provide a fishing reel securing device of the above-described character which will find universality of application in virtually all types of fishing rods incorporating the aforesaid reel-mounting ferrule and collar arrangement.

Other objects and advantages of the present invention will become apparent from the following detailed description taken in conjunction with the accompanying drawing.

BRIEF DESCRIPTION OF THE DRAWING

FIG. 1 is a side elevational view of a fragmentary portion of a fishing rod having a fishing reel mounted thereon by means of the reel-securing device of the present invention;

FIG. 2 is an enlarged fragmentary side elevational view of the portion of the structure of FIG. 1 shown within the circle 2 thereof;

FIG. 3 is an enlarged transverse cross-sectional view taken substantially along the line 3–3 of FIG. 1;

FIG. 4 is an enlarged fragmentary longitudinal cross-sectional view taken substantially along the line 4–4 of FIG. 1;

FIG. 5 is a cross-sectional view of the locking ring incorporated in the reel-securing device of the present invention, and FIG. 6 is a view similar to FIG. 5 showing the configuration which the locking ring assumes when the same is compressingly engaged by the associated ferrule and collar members on the fishing rod illustrated in FIG. 1.

DETAILED DESCRIPTION OF A PREFERRED EMBODIMENT

Referring now in detail to the drawing, a fishing reel securing device 10, in accordance with a preferred embodiment of the present invention, is shown in operative association with a fishing rod 12 having forward and rearward longitudinally spaced handle sections 14 and 16, respectively, which may, for example, be fabricated of cork or a similar material which facilitates manual gripping of the rod 12. The fishing rod 12 is provided with a conventional fishing reel, generally designated 18, which is illustrated as being of the spinning type and includes a fishing line housing section 20, gear case 22, rotatable handle 24, and support shank section 26 which may, for example, be formed integrally of the gear case 22. The upper or outer end of the support shank section 26 is formed with an integral, longitudinally extending mounting tang 28 which comprises forward and rearward tang sections 30 and 32 that project longitudinally forwardly and rearwardly from the support shank section 26 and have the side thereof confronting the fishing rod 12 dished or concaved to conform with the general curvature of the rod 12.

Extending longitudinally between the handle sections 14 and 16 is a hollow cylindrical reel-mounting member 34, the rearward end of which is externally threaded, as seen at 36. The rod section 34 is provided with a pair of tang-engaging ferrule members 38 and 40 which may be of a conventional construction and include laterally outwardly and longitudinally extending deformed portions 42 and 44, respectively, that define confronting recesses or pockets, generally designated 45, adapted to removably receive the longitudinally outer ends of the tang sections 30 and 32. As is conventional in fishing rods, one of the ferrules 38, 40 is fixedly mounted relative to the rod section 34, while the other of the ferrules 38, 40 is longitudinally movable or adjustable to permit mounting and dismounting of the associated fishing reel. In the construction shown and described herein, the ferrule 38 is preferably fixedly secured to the rod member 34, while the ferrule 40 is preferably slightly larger in diameter than the member 34 and is thereby adapted to slide freely longitudinally thereof.

Mounted on the externally threaded portion 36 of the member 34 is an annular mounting collar, generally designated 46, which comprises a generally cylindrically shaped main body section 48 that is internally threaded and thereby adapted to be threadably advanced and retracted longitudinally of the member 34 upon suitable rotation thereof along the external threads defined by the portion 36. The collar 46 is provided with a radially outwardly projecting externally serrated or knurled portion 50 which facilitates manual engagement thereof so that the collar 46 may be conveniently rotated.

As is well known in the art, when it is desired to mount the fishing rod 12 upon the reel 18, the longitudinally outer end of the tang section 30 is inserted into the pocket 45 defined by the deformed portion 42 of the ferrule 38. Thereafter, the ferrule 40 is moved longitudinally of the rod section 34 until the longitudinally outer end of the tang section 32 is received within the pocket 45 of deformed portion 44 thereof. Finally, the mounting collar 46 is appropriately rotated and thereby threadably advanced along the thread portion 36 of the member 34 so as to bias the ferrule 40 toward the ferrule 38, thus clampingly securing the mounting tang 28 interjacent the ferrules 38, 40 and hence positively securing the entire fishing reel 18 to the rod 12. As will hereinafter be described in detail, the fishing reel securing device 10 of the present invention is adapted to cooperate with the mounting collar 46 and movable ferrule 40 in resisting free rotation of the collar 46 relative to the member 34 so as to prevent any longitudinal displacement of the collar 46 and hence prevent the ferrule 40 from moving longitudinally away from its associated ferrule 38 which would result in the fishing reel 18 becoming inadvertently disengaged from the rod 12. It will be noted, incidently, that while the fishing reel securing device 10 of the present invention is shown in operative association with a spinning-type fishing reel, said device 10 is equally adapted for securing casting, fly, or other similar-type reels to the fishing rod 12.

As best seen in FIGS. 3 through 6, the locking device 10 is in the form of an annular or generally ring-shaped member 52 which is preferably fabricated of a generally resilient and compressible material and defines a central annular bore or aperture 54 which is slightly larger in diameter than the member 34 and is thereby adapted to be mounted on the member 34 for relatively free longitudinal sliding movement. The member 52 is interposed between the mounting collar 46 and the longitudinally movable ferrule 40, and in mounting the fishing reel 18 on the rod 12, the member 52 is adapted to be compressingly engaged between the adjacent ends of the ferrule 40 and mounting collar 46. By being thus compressed, the member 52 exerts a generally axially directed force against the mounting collar 46, thus resisting rotation thereof upon the threaded portion 36 of the member 34, with the result that the member 52 acts to lockingly secure the mounting collar 46 in place once it has been threadably advanced to a position securing the mounting tang section 28 of the reel 18 between the ferrules 38, 40.

In a preferred construction of the present invention, the member 52 is fabricated of a synthetic polymeric material, such as nylon, Delrin or a similar material exhibiting the above-described compressible resilient characteristics. Alternatively, the member 52 may be fabricated of molded hard rubber, either natural or synthetic, or various other compositions which are resistant to moisture and salt atmosphere, and which will retain their structural integrity after successive compressive axial loads are applied thereto, as would occur upon tightening the collar member 46 in the manner above described. The member 52 may be manufactured, for example, as by suitable well-known molding techniques, and may be originally provided in the form of an elongated tubular member which may be cut or severed transversely to provide a plurality of the members 52. Preferably, the member 52 is generally rectangular in transverse cross section, as seen in FIG. 5, although the member 52 may be of various other configurations without departing from the scope of the present invention.

In order to assure that the device 10 of the present invention, positively resists rotation of the mounting collar member 46, either one, and preferably both, of the members 40 and 46 is provided with a frustoconical or radially inwardly and longitudinally inclined tapered portion adapted to engage the adjacent end of the member 52. In a preferred construction of the present invention, the collar member 46 is provided with a counterbore 56 which defines a tapered wall section 58 at the axially inner end thereof, which tapered wall section 58, upon proper tightening of the collar member 46, is adapted to compressingly and deformingly engage the adjacent end with the member 52 so as to deform the radially outer, rearward edge thereof in a manner shown at 60 in FIG. 6. Similarly, the rearward end of the ferrule 40 confronting the member 52 is formed with a radially outwardly projecting swaged section 62 formed with an inturned or reversely bent flange portion 64 defining a tapered face portion 66. Upon suitable tightening of the collar 46, the member 52 will be forced into engagement with the face 66, thereby deforming the adjacent radially outer edge portion of the member 52, as seen at 68 in FIG. 6. By thus providing the face 66 and wall section 58 on the ferrule 40 and collar member 46, respectively, a greater bearing area is provided between the ferrule 40, collar 46 and the member 52 upon engagement therewith. This enlarged bearing area functions to enhance the resistance of rotation of the collar member 46 provided by the member 52 so as to render the securing device 10 of the present invention more positive in action.

It will be seen from the above-described description of the present invention that the reel-securing device 10 provides for positive mounting of a fishing reel, such as the reel 18, to its associated fishing rod such as the rod 12, yet is of an extremely simple design so as to be easily assembled and economically manufactured. By virtue of the fact that the member 52 may be fabricated by well-known molding techniques or the like, said member will readily lend itself to modern mass-production techniques. Moreover the member 52 may be operatively associated with fishing rods and reels of virtually all commonly used varieties, with the result that the present invention will find well-accepted universality of application.

While it will be apparent that the preferred embodiment illustrated herein is well calculated to fulfill the objects above stated, it will be appreciated that the present invention is susceptible to modification, variation and change without departing from the proper scope or fair meaning of the subjoined claims.

I claim:

1. In combination with a fishing rod comprising a handle section adapted to operatively support the mounting section of an associated fishing reel, ferrule means adjustably movable longitudinally of the fishing rod and engageable with the mounting section of the fishing reel for securing said reel on said rod, collar means rotatably and threadably mounted on said handle section for limiting longitudinal movement of said ferrule means relative to said reel mounting section, and means including an annular locking element interposed between said ferrule means and said collar means for resisting rotation of said collar means so as to prevent longitudinal displacement of said collar means relative to said ferrule means and thereby maintain said ferrule means positively engaged with said mounting section of said fishing reel.

2. The invention as set forth in claim 1 wherein said locking element comprises a relatively compressible member.

3. The invention as set forth in claim 1 wherein said locking element comprises a relatively resilient member.

4. The invention as set forth in claim 1 wherein said locking element is fabricated of a synthetic polymeric material.

5. The invention as set forth in claim 1 wherein said locking element comprises a generally ring-shaped member mounted circumjacent to said handle section, and wherein said collar means includes means for compressingly engaging the adjacent end of said member.

6. The invention as set forth in claim 1 which includes a pair of longitudinally spaced ferrule members, wherein said fishing reel comprises a longitudinally extending tang section adapted to be engaged at one end by one of said ferrule members and at the opposite end by the other of said ferrule members, and wherein said locking element comprises a locking ring mounted interjacent said collar means and one of said ferrule members.

7. The invention as set forth in claim 6 wherein one end of said collar means is adapted to compressingly engage said locking ring.

8. The invention as set forth in claim 6 wherein said adjacent ferrule member is adapted to compressingly engage said locking ring.

9. The invention as set forth in claim 6 wherein said locking ring is fabricated of a relatively resilient compressible material.

10. The invention as set forth in claim 9 wherein said locking ring is fabricated of a synthetic polymeric material.

11. The invention as set forth in claim 6 wherein either said collar means or said adjacent of said ferrule members is formed with a generally tapered portion adapted to compressingly engage the adjacent end portion of said locking ring.

12. The invention as set forth in claim 11 wherein said adjacent ferrule member comprises a generally radially inwardly and longitudinally inclined tapered portion adapted to compressingly engage the adjacent edge of said locking ring.

13. The invention as set forth in claim 11 wherein said collar means is formed with a generally radially inwardly and longitudinally inclined tapered portion adapted to compressingly engage the adjacent edge of said locking ring.

14. The invention as set forth in claim 11 wherein said collar means comprises an annular member threadably mounted on said handle section, the end of said collar member confronting said locking ring being formed with a radially inwardly and longitudinally inclined tapered portion adapted to compressingly engage the adjacent end of said locking ring, wherein said adjacent of said ferrule members comprises a swaged portion adapted to compressingly engage the adjacent end of said locking ring, and wherein said locking ring is generally rectangular in transverse cross section and is fabricated of a resilient compressible synthetic polymeric material.